United States Patent
Hotary et al.

(10) Patent No.: US 6,752,304 B1
(45) Date of Patent: Jun. 22, 2004

(54) REAR CARGO STORAGE ASSEMBLY

(75) Inventors: James T. Hotary, Holland, MI (US); David B. Busch, Holland, MI (US); Michael E. Wiedeman, Manhattan Beach, CA (US)

(73) Assignee: Johnson Controls Technology Company, Plymouth, MI (US)

( * ) Notice: Subject to any disclaimer, the term of this patent is extended or adjusted under 35 U.S.C. 154(b) by 15 days.

(21) Appl. No.: 10/030,642

(22) PCT Filed: Jul. 7, 2000

(86) PCT No.: PCT/US00/18822
§ 371 (c)(1),
(2), (4) Date: Jun. 10, 2002

(87) PCT Pub. No.: WO01/02217
PCT Pub. Date: Jan. 11, 2001

Related U.S. Application Data
(60) Provisional application No. 60/142,711, filed on Jul. 7, 1999.

(51) Int. Cl.[7] .............................................. B60R 7/00
(52) U.S. Cl. .................... 224/544; 224/925; 296/37.8; 296/37.14
(58) Field of Search ................................. 224/484, 485, 224/495, 498, 501, 502, 506, 526, 527, 539, 542, 544, 925; 296/37.5, 37.8, 37.14, 37.16

(56) References Cited

U.S. PATENT DOCUMENTS

| | | | | |
|---|---|---|---|---|
| 5,484,091 A | * | 1/1996 | Malinowski et al. | 224/542 |
| 5,501,384 A | * | 3/1996 | Wisniewski | 224/539 |
| 5,584,412 A | * | 12/1996 | Wang | 220/500 |
| 6,015,071 A | * | 1/2000 | Adomeit et al. | 224/42.34 |
| 6,488,168 B1 | * | 12/2002 | Wang | 220/7 |
| 6,520,364 B2 | * | 2/2003 | Spykerman et al. | 220/6 |

* cited by examiner

Primary Examiner—Stephen K. Cronin
(74) Attorney, Agent, or Firm—Foley & Lardner LLP

(57) ABSTRACT

A removable storage tray frame (20) which is insertable into a storage compartment (16) in the floor (14) of a vehicle (10) is provided. The storage tray frame (20) has at least one door (24) which is capable of being rotated from a first horizontal position to a second generally vertical position. The door (24) is capable of being inserted into a pair of slots (28) formed in the storage tray frame (20) to act as a divider of the storage compartment (16).

16 Claims, 4 Drawing Sheets

REAR CARGO STORAGE ASSEMBLY

This application is a 371 of PCT/US00/18822 filed Jul. 7, 2000 which claims benefit of Provisional No. 60/142,711 filed Jul. 7, 1999.

SUMMARY OF THE INVENTION

In accordance with the teachings of the present invention, a flexible cargo storage area is disclosed which increases user customization and flexibility by virtue of its simplicity and aesthetic cleanliness.

In one embodiment of the current invention, a removable storage tray which is insertable into a storage compartment in the floor of a vehicle is provided. The storage tray has at least one door which is capable of being rotated from a first horizontal position to a second generally vertical position. The door is capable of being inserted into a pair of slots formed in the storage tray to act as a divider of the storage compartment.

In a second embodiment of the current invention, the storage tray has a plurality of dividers which form a number of trays in the removable storage tray assembly. A plurality of lids are provided which serve as dividers of the compartmentalized storage compartment.

In a third embodiment of the current invention, hinges are provided which allow for easy rotation of the doors. A pin type hinge is provided which allows for the insertion of the doors into corresponding slots.

BRIEF DESCRIPTION OF THE DRAWINGS

The various advantages of the present invention will become apparent to one skilled in the art upon reading the following specification and by reference to the drawings in which.

DETAILED DESCRIPTION OF THE PREFERRED EMBODIMENTS

The following description of the preferred embodiments is merely exemplary in nature and is no way intended to limit the invention, or its application, or uses.

Figure 1:
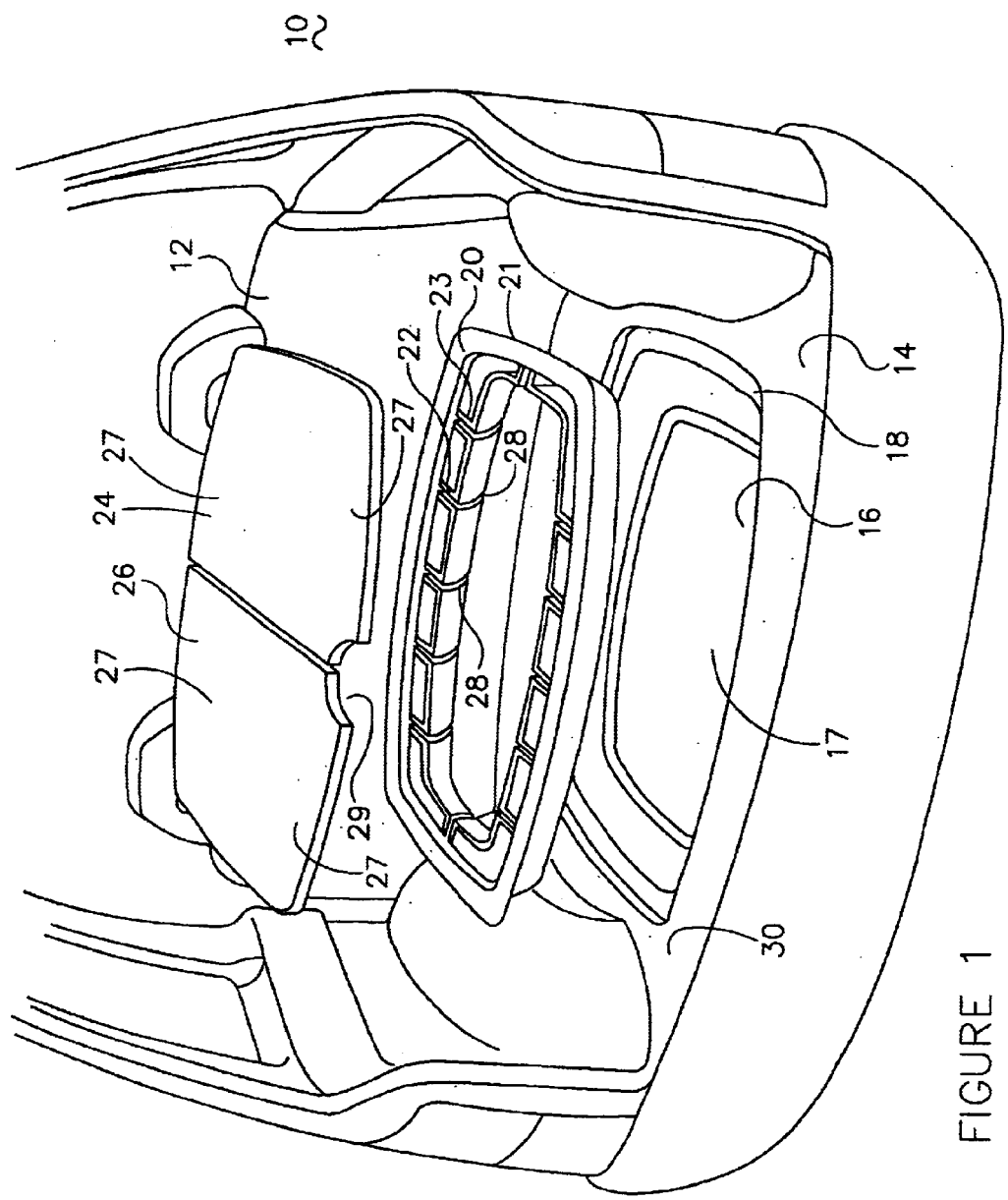
FIGS. 1 and 2 are rear perspective views of a cargo storage system utilized in the cargo area and made in accordance with the teachings of the present invention.
Figure 2:
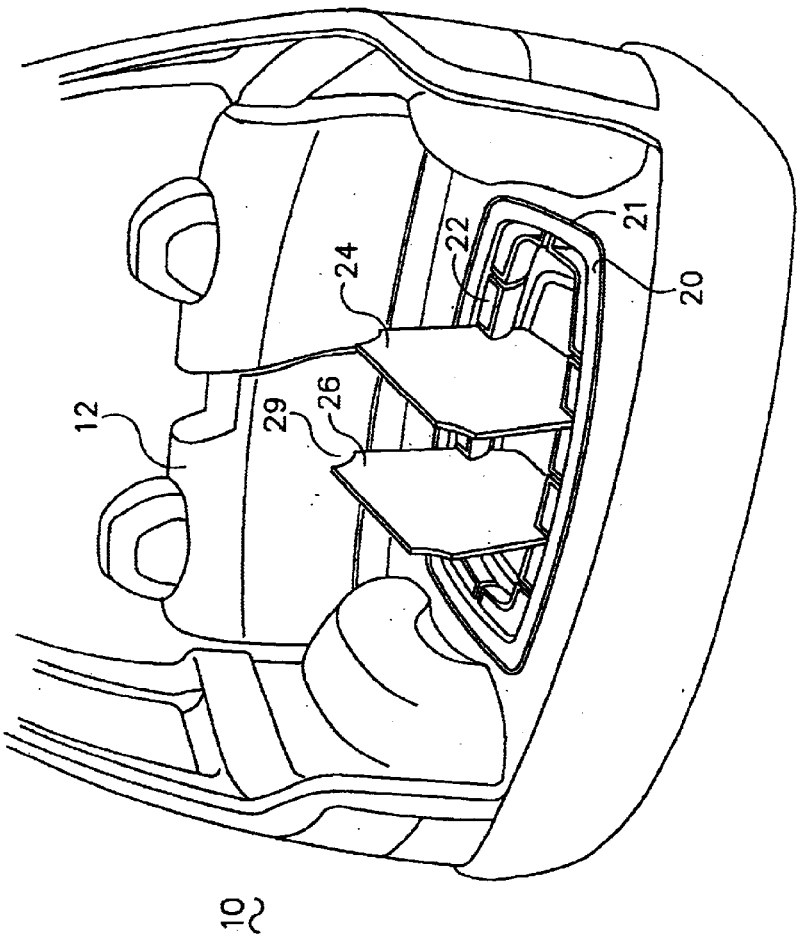

Referring to FIGS. 1 and 2, the cargo area 10 of the present invention is shown to include a removable storage tray frame 20 which can be nested in a recessed portion of the vehicle floor 14 and can act as a cover for access to a storage compartment 16 below the removable tray frame 20 (for example for storing a spare tire). The removable tray frame 20 incorporates support ribs 23 around a peripheral portion 22 to enable the user to partition the storage tray frame 20 in a variety of ways by utilizing one or more lids 24 and 26. The lids 24 and 26 in the preferred embodiment also act as a cover for the storage tray when horizontally positioned over the tray frame 20. The tray frame 20 itself can incorporate fixed storage portions or bins, such as a peripheral edge bin 39 to secure emergency use equipment or tools. Further, the lids 24 and 26 themselves which are used as dividers can also incorporate reflective surfaces for use as hazard triangles or warning devices during road side emergencies. Tie down loops and anchorages are also provided within the storage tray and throughout the remainder of the vehicle cargo area to secure ropes, bungee cords, or cargo nets which are used to hold cargo items being transported.

The vehicle floor 14 of the cargo area 10 defines a storage compartment 16 having a bottom 17. The storage compartment 16 further defines a storage compartment ledge 18 for receivably accepting a storage compartment lip 21. Defined within the peripheral portion 22 are a plurality of receiving slots 28 for receiving the first and second lids 24 and 26. Each lid has a mechanism which allows the operator to gain easy access to the storage area 16. Optionally, each lid 24 and 26 has a cut out 29 which enable a operator to lift and rotate the lids. These lids function to section off the storage compartment 16 into definable areas to reduce the amount of movement of items placed within the storage compartment 16.

Figure 3:
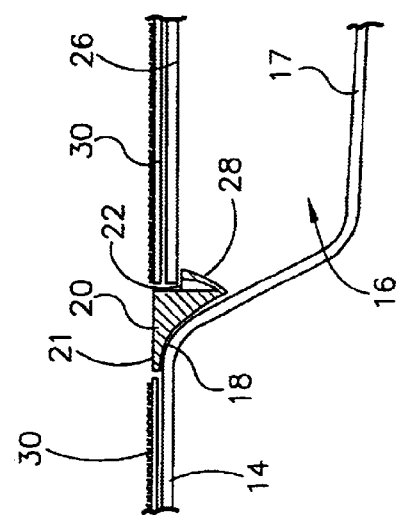
FIG. 3 is a sectional view of the cargo storage system in accordance with the present invention.

FIG. 3 shows a cross-sectional view of the storage compartment 16 of the current invention. Shown is the relationship of the removable tray frame 20, removable tray lip 21 and the storage compartments ledge 18. As is shown, the storage compartment 16 is recessed into the vehicle floor 14 and the removable tray frame 20 is positioned so that it is flush with the optional carpet 30 covering the cargo area 10. Further shown is the receiving slot 28 for receivably engaging the engagement surfaces 27 of the lids 24 and 26. The lids 24 and 26 can optionally have a layer of carpet 30. It is envisioned that the lids 24 and 26 have a thickness which will not allow rattling due to road vibration when the lids are placed within the slots 28.

Figure 8:
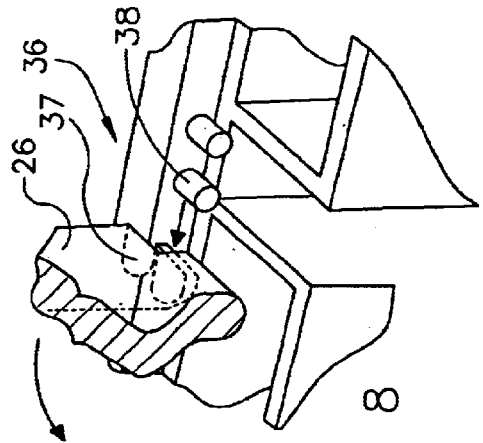
FIGS. 8 and 9 are perspective views of the hinge mechanism of the present invention.
Figure 5:
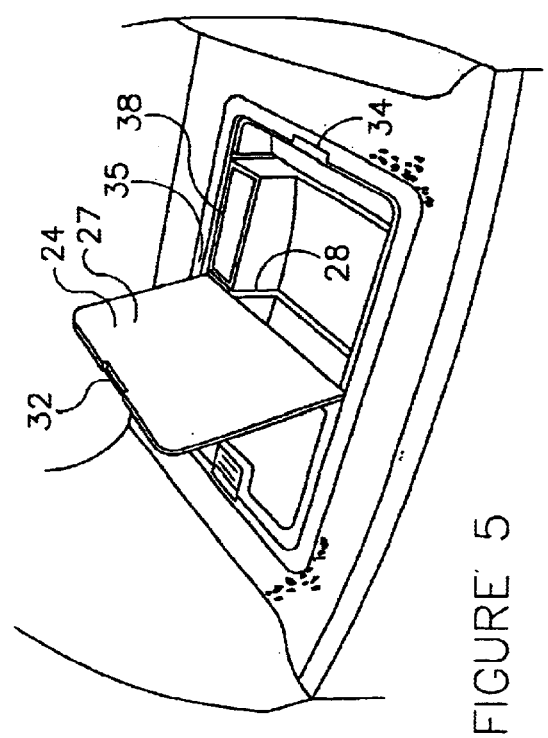
Figure 7:
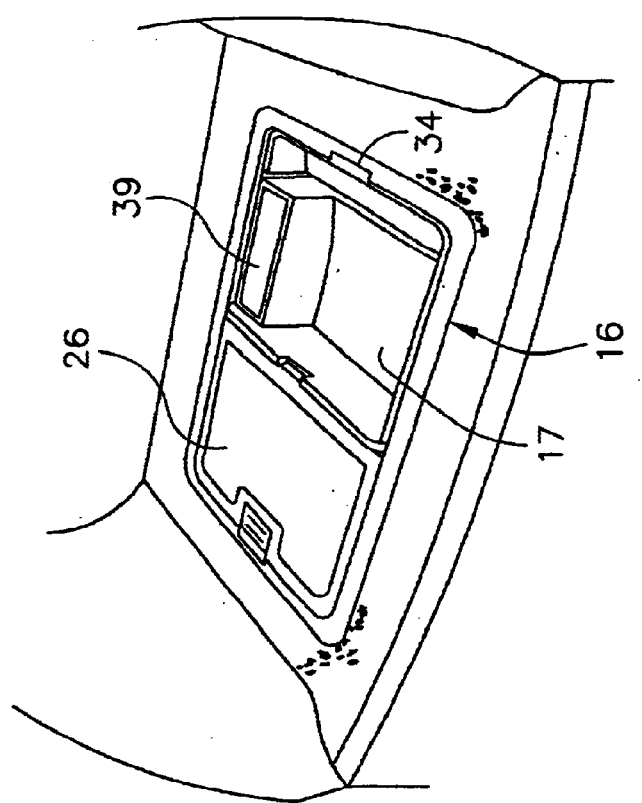
FIGS. 6 and 7 show the insertion of one of the doors of the present invention.
Figure 6:
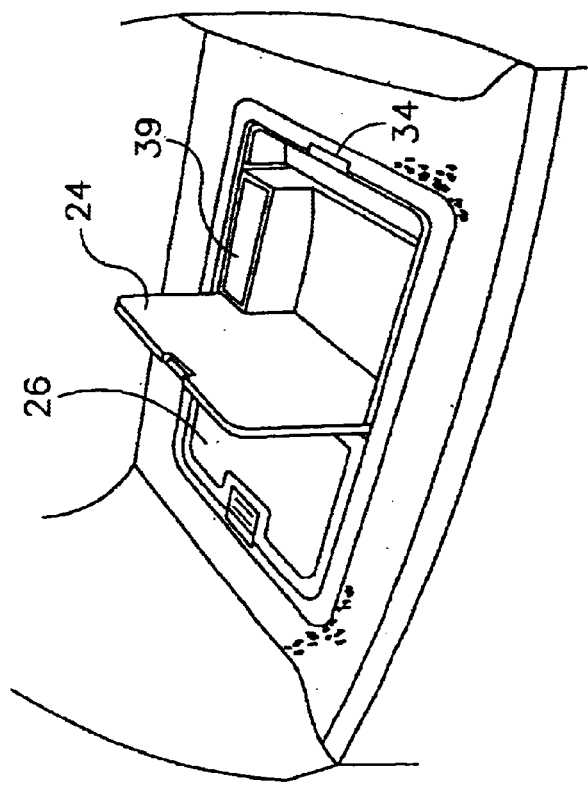

FIGS. 4 through 7 show the use of one embodiment of the current invention. As is shown, the lids 24 and 26 have handles 32 and 33 which function to latch close the removable storage tray frame 20. As is shown in FIG. 5, the lid 24 is rotatable about a pivot point 35 to allow for access to a portion of the removable tray frame 20. When the lid is removed from its horizontal position, the lid is slidable into one of a plurality of receiving slots 28. As is best seen in FIGS. 6 and 8, the lids 24 and 26 are capable of being slid and frictionally engage the slots 28 at the engagement surface 27. In their fully stored position, the lids 24 and 26 can optionally engage the bottom 17 of the storage compartment 16. These lids function to provide dividers in the now open storage compartment.

Figure 9:
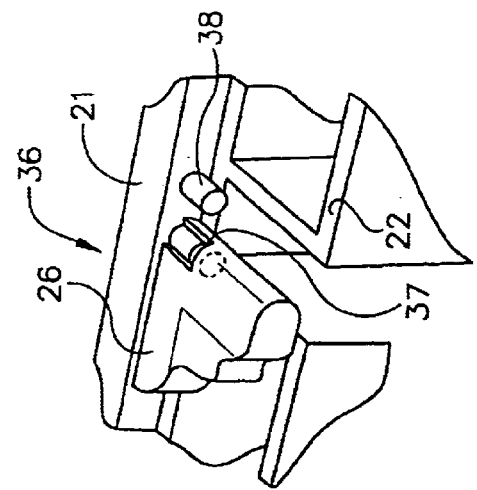
Figure 4:
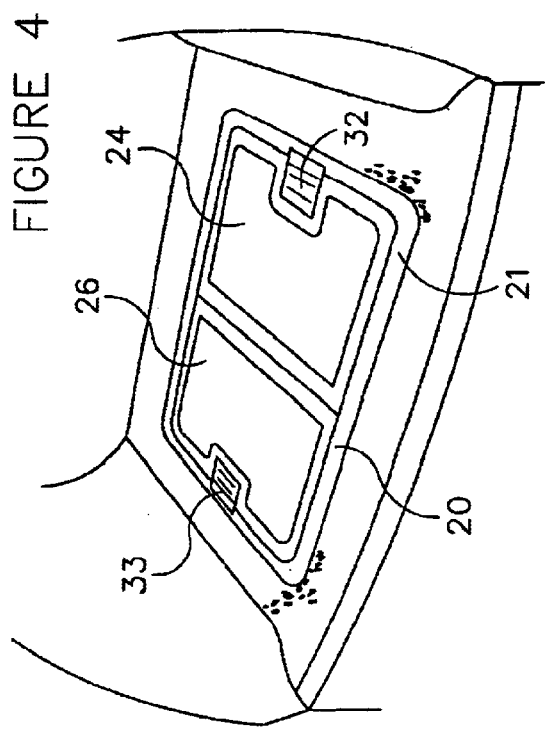
FIGS. 4 and 5 are an alternate embodiment of the cargo storage system of the present invention.

As is best seen in FIGS. 8 and 9, each lid 24 and 26 preferably has a disengagable hinge mechanism 36 at its pivot point 35. The hinge mechanism 36 is formed by a pin 38 and a pin receiving portion 37 disposed on the removable storage compartment lids 24 and 26.

To open the lid 24, the handle 32 is used to unlatch the lid from a latch mechanism 34. The lid 24 is rotated about the hinge point 35 on the pin 38 until the pin receiving portion 37 can be disengaged. Upon disengagement, the door can be slid along a surface 38 of the peripheral portion 22 and slid into the receiving slot 28. The engagement portions 27 engage the surfaces of the engagement slot 28 and allow the lid to be dropped in. Other types of hinge assemblies which allow for the detachable rotation of the lids 24 and 26 are envisioned.

It is to be understood that the invention is not limited to the exact construction illustrated and described above, but that various changes may be made if not thereby departing from the scope of the invention as defined in the following claims.

What is claimed is:

1. A storage tray assembly for use in a storage compartment of a vehicle floor comprising:
   a storage tray frame which is capable of being received in a storage compartment formed in the floor of a vehicle;
   a tray lid capable of being positioned in a first orientation in said storage compartment frame so that the storage compartment is at least partially covered and is further capable of being received in a second orientation in said storage tray frame so that the tray lid extends at least partially into the storage compartment.

2. The storage assembly of claim 1 wherein said storage compartment frame further comprises a plurality of slots for receiving said tray lid.

3. The vehicle storage assembly of claim 1 further comprising at least one tray portion integrally formed therein.

4. The storage compartment assembly of claim 1 wherein said tray lid is rotatable about a first pivot point.

5. The storage assembly of claim 1 wherein the storage compartment frame is removable from said storage compartment.

6. The storage tray assembly of claim 1 wherein said lid is removable from said tray assembly.

7. A storage tray assembly for use in a storage compartment of a vehicle floor comprising:
   a storage tray frame which is capable of being received in a storage compartment formed in the floor of a vehicle; and
   a plurality of dividers configured to extend at least partially into the storage compartment to form a plurality of peripheral edge bins in said storage tray frame.

8. The storage tray assembly of claim 7 further comprising a plurality of lids which are capable of serving as dividers of the storage compartment.

9. The storage tray assembly of claim 8 wherein said storage compartment frame further comprises a plurality of slots for receiving said tray lids.

10. The storage tray assembly of claim 8 wherein the storage tray frame defines a lip portion for engaging a portion of said storage compartment.

11. The storage tray assembly of claim 8 wherein the storage tray frame defines a lip portion for engaging a portion of said storage compartment.

12. The storage tray assembly of claim 8 further comprising a pair of hinges coupling said lid to said storage tray frame.

13. A storage compartment assembly for use in a vehicle floor comprising:
   a plurality of walls defining a cavity;
   a lid having a first end and a second end and operable to cover the cavity;
   a hinge coupled to the lid between the first end and the second end;
   the lid further being operable to take a first and second position, wherein in the second position the lid divides the cavity into discrete storage areas.

14. The storage compartment assembly of claim 13 further having a plurality of slots disposed on said walls.

15. The storage compartment assembly of claim 14 wherein said slots are disposed adjacent said medial location.

16. The storage compartment assembly of claim 15 further comprising a peripheral edge bin.

* * * * *